United States Patent
Piras et al.

(10) Patent No.: US 11,327,092 B2
(45) Date of Patent: May 10, 2022

(54) SUBSURFACE ATOMIC FORCE MICROSCOPY WITH GUIDED ULTRASOUND WAVES

(71) Applicant: NEDERLANDSE ORGANISATIE VOOR TOEGEPAST-NATUURWETENSCHAPPELIJK ONDERZOEK TNO, 's-Gravenhage (NL)

(72) Inventors: Daniele Piras, Amsterdam (NL); Paul Louis Maria Joseph van Neer, Bergschenhoek (NL); Hamed Sadeghian Marnani, Nootdorp (NL)

(73) Assignee: NEDERLANDSE ORGANISATIE VOOR TOEGEPAST-NATUURWETENSCHAPPELIJK ONDERZOEK TNO, 's-Gravenhage (NL)

( * ) Notice: Subject to any disclaimer, the term of this patent is extended or adjusted under 35 U.S.C. 154(b) by 414 days.

(21) Appl. No.: 16/604,000

(22) PCT Filed: Apr. 23, 2018

(86) PCT No.: PCT/NL2018/050256
§ 371 (c)(1),
(2) Date: Oct. 9, 2019

(87) PCT Pub. No.: WO2018/199746
PCT Pub. Date: Nov. 1, 2018

(65) Prior Publication Data
US 2021/0109128 A1   Apr. 15, 2021

(30) Foreign Application Priority Data
Apr. 24, 2017   (EP) .................................. 17167754

(51) Int. Cl.
*G01Q 60/42*   (2010.01)
*G01N 29/06*   (2006.01)
(Continued)

(52) U.S. Cl.
CPC ......... *G01Q 60/42* (2013.01); *G01N 29/0681* (2013.01); *G01N 29/265* (2013.01);
(Continued)

(58) Field of Classification Search
CPC .. G01Q 60/42; G01N 29/0681; G01N 29/265; G01N 2291/0425; B82Y 15/00; B82Y 30/00; B82Y 35/00
(Continued)

(56) References Cited

U.S. PATENT DOCUMENTS

| | | | |
|---|---|---|---|
| 2010/0043107 A1* | 2/2010 | Proksch | G01Q 60/32 850/40 |
| 2013/0060141 A1* | 3/2013 | Sinelnikov | G01N 29/221 600/439 |
| 2016/0060127 A1* | 3/2016 | Madani | C23C 18/1245 427/560 |

FOREIGN PATENT DOCUMENTS

| | | |
|---|---|---|
| EP | 3349016 A1 | 7/2013 |
| JP | 2012083130 A | 4/2012 |
| WO | 2008141301 A1 | 11/2008 |

OTHER PUBLICATIONS

Shekhawat et al., "Probing Buried Defects in Extreme Ultraviolet Multilayer Blanks Using Ultrasound Holography", IEEE Transactions on Nanotechnology, 2010, vol. 9, No. 6, pp. 671-674.
(Continued)

*Primary Examiner* — Nicole M Ippolito
(74) *Attorney, Agent, or Firm* — Lucas & Mercanti, LLP

(57) ABSTRACT

Methods and systems for subsurface imaging of nanostructures buried inside a plate shaped substrate are provided. An ultrasonic generator at a side face of the substrate is used to
(Continued)

couple ultrasound waves (W) into an interior of the substrate. The interior has or forms a waveguide for propagating the ultrasound waves (W) in a direction (X) along a length of the substrate transverse to the side face. The nanostructures are imaged using an AFM tip to measure an effect (E) at the top surface caused by direct or indirect interaction of the ultrasound waves (W) with the buried nanostructures.

15 Claims, 8 Drawing Sheets

(51) Int. Cl.
*G01N 29/26* (2006.01)
*G01N 29/265* (2006.01)
*B82Y 15/00* (2011.01)
*B82Y 30/00* (2011.01)
*B82Y 35/00* (2011.01)

(52) U.S. Cl.
CPC ............... *B82Y 15/00* (2013.01); *B82Y 30/00* (2013.01); *B82Y 35/00* (2013.01); *G01N 2291/0422* (2013.01); *G01N 2291/0425* (2013.01)

(58) Field of Classification Search
USPC .............................................. 850/21, 22, 33
See application file for complete search history.

(56) References Cited

OTHER PUBLICATIONS

International Search Report and Written Opinion for Corresponding International Application No. PCT/NL2018/050256 (10 Pages) (Jul. 11, 2018).

* cited by examiner

SUBSURFACE ATOMIC FORCE MICROSCOPY WITH GUIDED ULTRASOUND WAVES

CROSS-REFERENCE TO RELATED APPLICATIONS

This application is a 371 of PCT/NL2018/050256, filed Apr. 23, 2018, which claims the benefit of European Patent Application No. 17167754.5, filed Apr. 24, 2017.

TECHNICAL FIELD AND BACKGROUND

The present disclosure relates to methods and systems for subsurface imaging of nanostructures buried inside a three dimensional (3D) substrate such as a 3D integrated chip.

In semiconductor applications, alignment, overlay, metrology, and defect detection are challenging subjects. For example, 3D NAND is now introduced as the next generation of memory applications. These chips may consists of hundreds of layers with a total thickness of few micrometers. Since semiconductor components may by opaque, the alignment of the wafers and sublayers cannot always rely on optical methods.

Atomic force microscopy (AFM), empowered by the use of ultrasound excitation can give information of the subsurface. For example, ultrasound can be delivered through the bottom of the substrate (chip) while the dynamic response of the AFM cantilever and tip in contact with the sample is monitored through the measurement of the contact resonance frequency or the measurement of the amplitude or phase change close to contact resonance. However, the propagation of ultrasound waves from the bottom may be difficult to control and predict through the many layers of the substrate, thus affecting the imaging particularly when the substrate comprises multiple sublayers each having nanostructures.

Accordingly there remains a need for improving reliability and control over subsurface imaging of nanostructures buried at ever greater depths below the substrate surface.

SUMMARY

One aspect of the present disclosure provides a method for subsurface imaging of nanostructures buried inside a 3D substrate, e.g. chip. An atomic force microscope is provided with an AFM tip at a top surface of the substrate. An ultrasonic generator is provided at a side face of the substrate, i.e. transverse to the top surface. The ultrasonic generator can thus be used to couple ultrasound waves via the side face into the substrate, or into a selected part of the substrate. Advantageously, the interior of the substrate may comprise or form a waveguide for propagating the ultrasound waves in a direction along a length of the substrate transverse to the side face. To behave as guided waves, a wavelength of the ultrasound waves propagating in the waveguide is selected to be larger than a thickness of the waveguide transverse to the direction of propagation. The nanostructures may be imaged using the AFM tip to measure an effect at the top surface caused by direct or indirect interaction of the guided ultrasound waves with the buried nanostructures.

It will be appreciated that relatively thin, e.g. plate shaped structures such an integrated chips, or circuit layers inside the chip may typically have sufficiently small dimensions with respect to a wavelength of the ultrasound waves so that they may act as wave guides. By injecting the ultrasound waves from the side and using the substrate or sublayer as waveguides, the propagation of the waves can be accurately predicted, e.g. depending on a selected wave mode. For example, an injected wave may act as a moving sound source propagating from the side over a length of the sample. In some embodiments, ultrasound waves are injected in a limited time window. In other or further embodiments, ultrasound waves are injected continuously. In some embodiments, the ultrasound waves are reflected between side faces of the substrate. In such embodiments, the ultrasound waves may form standing waves in the substrate. In other embodiments, ultrasound waves may be absorbed or transmitted e.g. to a (block of) material, e.g. disposed at a side face of the substrate opposite the actuation side face.

Ultrasound waves in a MHz range may benefit from elasticity contrast while ultrasound waves in in a GHz range may benefit from scattering contrast or a combination of scattering and elasticity. In elasticity contrast regime (MHz frequencies) the substrate (chip) or the cantilever is typically actuated at ultrasound frequencies above the contact resonance of the cantilever. In scattering contrast regime (GHz frequencies) the substrate or the cantilever is typically actuated at ultrasound frequencies such that the acoustic wavelength is comparable/shorter than the critical dimensions of nanostructures in the sample.

In one embodiment, the ultrasound waves interact with the nanostructures by scattering, typically in a GHz frequency range between 0.6-100 GHz, or higher. In another or further embodiment, the ultrasound waves interact with the nanostructures by elastic interaction, typically in a MHz frequency range between 1-250 MHz, or lower.

In some embodiments, the ultrasound waves may traverse a region with the nanostructures to be imaged, i.e. the nanostructures are comprised in the substrate or sublayer forming the waveguide. For example, elastic interaction in the MHz range typically occurs in the whole substrate including a region with the nanostructures to be imaged. For example, scattering interaction in the GHz range may occur when the whole substrate acts as waveguide or with nanostructures comprised in a sublayer acting as waveguide.

In other or further embodiments, the nanostructures may be outside of a sublayer forming the waveguide and interact e.g. with secondary waves leaked from the sublayer forming the waveguide. For example, secondary waves can be emitted from the waveguide into the surrounding sample with a wave front at an angle with respect to a length of the waveguide, or as evanescent waves. The angle and/or character of the secondary waves may depend on the relative difference between the speed of sound outside the waveguide and the phase velocity inside the waveguide which can be tuned depending on the wave mode or frequency. In some embodiments, secondary waves are emitted and then propagate from bottom to top, i.e. the waveguide is below the nanostructures, and the secondary waves interact with the nanostructures by scattering transmission there through. In other or further embodiments, secondary waves are emitted and then propagate from top to bottom, i.e. the waveguide is above the nanostructures, and the secondary waves interact with the nanostructures by scattering reflection there off.

BRIEF DESCRIPTION OF DRAWINGS

These and other features, aspects, and advantages of the apparatus, systems and methods of the present disclosure will become better understood from the following description, appended claims, and accompanying drawing wherein:

DESCRIPTION OF EMBODIMENTS

Figure 1A:
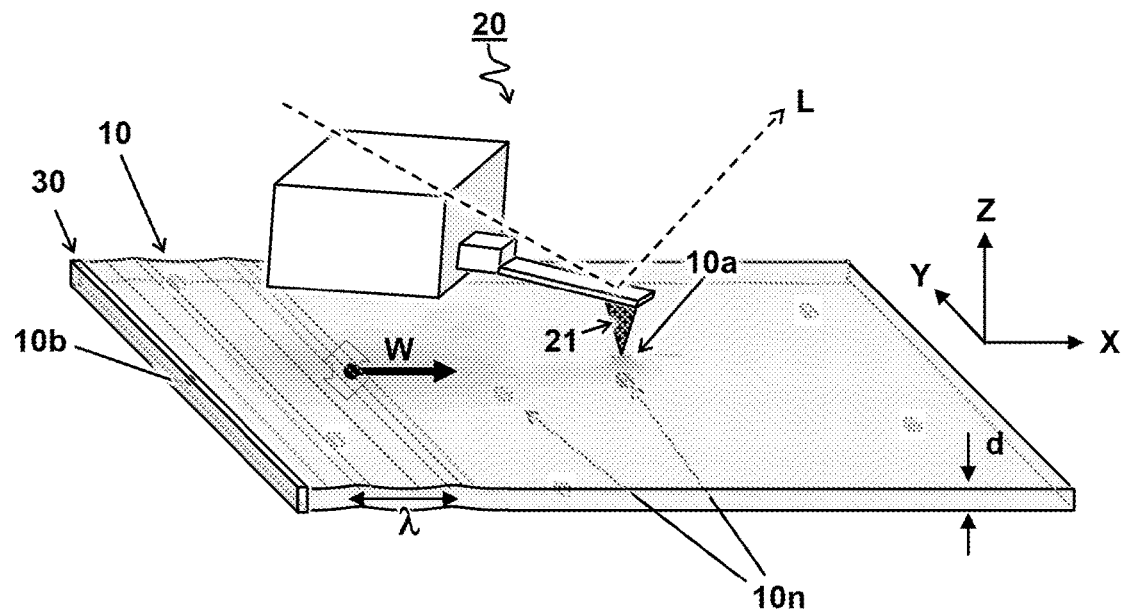
FIG. 1A schematically illustrates a perspective view of an embodiment for imaging subsurface nanostructures.

Terminology used for describing particular embodiments is not intended to be limiting of the invention. As used herein, the singular forms "a", "an" and "the" are intended to include the plural forms as well, unless the context clearly indicates otherwise. The term "and/or" includes any and all combinations of one or more of the associated listed items. It will be understood that the terms "comprises" and/or "comprising" specify the presence of stated features but do not preclude the presence or addition of one or more other features. It will be further understood that when a particular step of a method is referred to as subsequent to another step, it can directly follow said other step or one or more intermediate steps may be carried out before carrying out the particular step, unless specified otherwise. Likewise it will be understood that when a connection between structures or components is described, this connection may be established directly or through intermediate structures or components unless specified otherwise.

The invention is described more fully hereinafter with reference to the accompanying drawings, in which embodiments of the invention are shown. The description of the exemplary embodiments is intended to be read in connection with the accompanying drawings, which are to be considered part of the entire written description. In the drawings, the absolute and relative sizes of systems, components, layers, and regions may be exaggerated for clarity. Embodiments may be described with reference to schematic and/or cross-section illustrations of possibly idealized embodiments and intermediate structures of the invention. In the description and drawings, like numbers refer to like elements throughout. Relative terms as well as derivatives thereof should be construed to refer to the orientation as then described or as shown in the drawing under discussion. These relative terms are for convenience of description and do not require that the system be constructed or operated in a particular orientation unless stated otherwise.

Figure 1B:
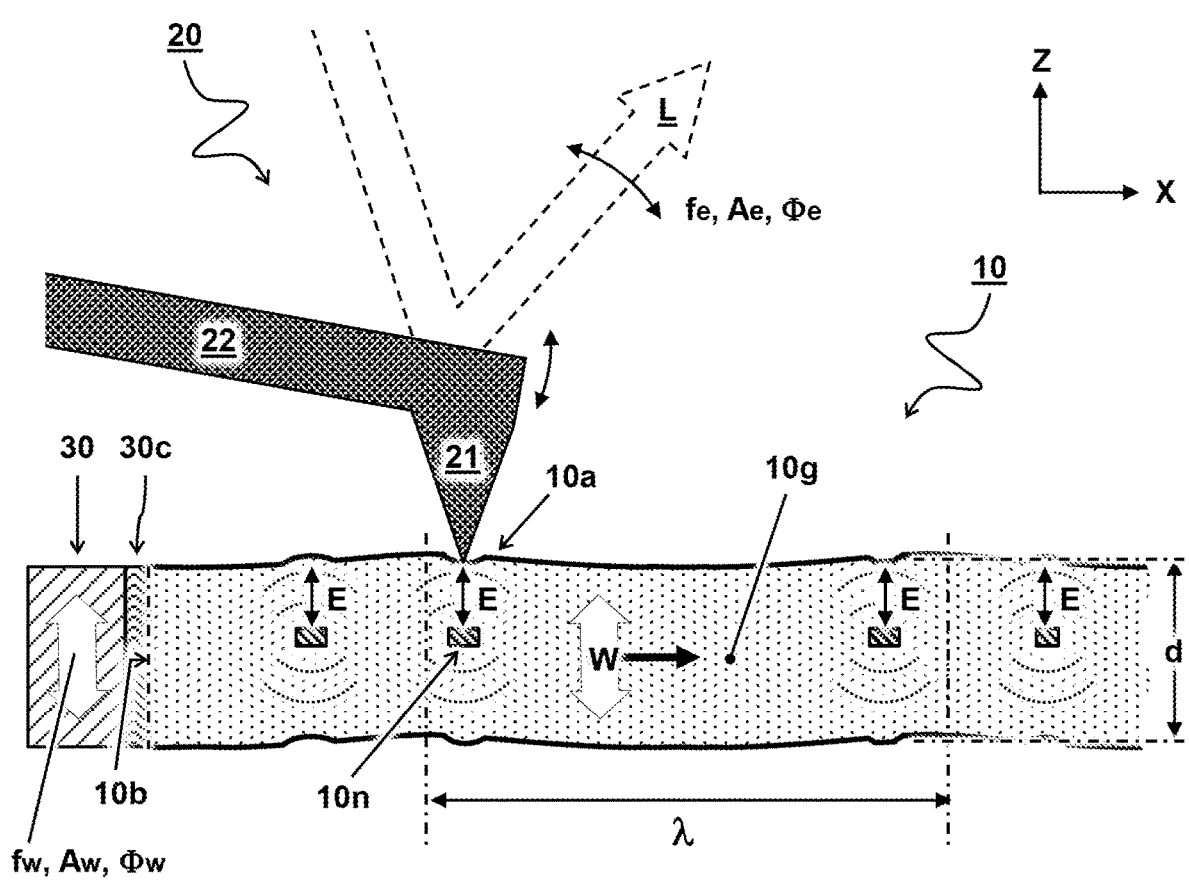
FIG. 1B schematically illustrates a cross section view of the embodiment.

FIGS. 1A and 1B schematically illustrate an embodiment for subsurface imaging of nanostructures 10n buried inside a plate shaped substrate 10.

In a preferred embodiment, an atomic force microscope 20 is provided with an AFM tip 21 disposed at a top surface 10a of the substrate 10 while at least one ultrasonic generator 30 is disposed at a side face 10b of the substrate 10, i.e. transverse to the top surface 10a. For example, the ultrasonic generator 30 directly or indirectly contacts the side face 10b with an actuating element, e.g. piezoelectric or electrostatic transducer. Optionally, the ultrasonic generator 30 couples to the side face 10b via a coupling medium 30c there between, e.g. water. Preferably, the coupling medium 30c comprises material such as wax that is able to transmit transversal vibration between the ultrasonic generator 30 and the side face 10b, e.g. vibrations in a direction "Z" parallel to the side face 10b and/or transverse to the top surface 10a.

The ultrasonic generator 30 can be used to couple ultrasound waves "W" via the side face 10b into an interior of the substrate 10. As described herein, the interior comprises or forms a waveguide 10g for propagating the ultrasound waves "W" in a direction "X" along a length of the substrate 10 or transverse to the side face 10b. When one dimension of an object in which elastic waves are generated is thin compared to the wavelength, guided waves can be generated. Accordingly, a (minimum) wavelength "λ" of at least one wave mode of the guided ultrasound waves "W" propagating in the waveguide 10g is preferably larger than a thickness "d" of the waveguide 10g transverse to the direction of propagation "X". For example, the wavelength "λ" is larger than the thickness "d" by a factor of at least two, five, or ten.

In some embodiments, the nanostructures 10n are imaged by using the AFM tip 21 to measure an effect "E" at the top surface 10a caused by direct or indirect interaction of the ultrasound waves "W", e.g. in a particular wave mode, with the buried nanostructures 10n. In one embodiment, the nanostructures 10n are imaged based on a vibrational characteristic of an AFM cantilever 22 comprising the AFM tip 21. For example, the vibrational characteristic comprises one or more of a measured frequency "fe", amplitude "Ae" and/or phase "Φe" of the dynamic response of the vibrating AFM cantilever 22 at, or close to, contact resonance.

In some embodiments, the vibrational characteristic is compared to a reference value, e.g. based on an input value for driving an actuator of the system such as the ultrasonic generator 30, an actuator of the AFM cantilever 22 and/or other actuators, e.g. actuating the bottom or other side surfaces of the substrate 10, or actuating the tip. In a preferred embodiment, the effect "E" is measured as a function of an input parameter for driving the ultrasonic generator 30, e.g. a comparative measurement with and without the ultrasound waves "W", or with ultrasound waves "W" having different input characteristics such as driving frequency "fw", amplitude "Aw" and/or phase "Φw" of the ultrasonic generator 30.

In some embodiments, the measurement comprises lock-in amplification or selection of a measured signal as a function of an input parameter for generating the ultrasound waves "W". In one embodiment, the measurement comprises homodyne detection using the ultrasonic generator 30 to actuate the side face 10b with an input frequency "fw", and amplifying that frequency in an output signal measured via the vibrating AFM cantilever 22. In another or further embodiment, the measurement comprises heterodyne detection using one or more ultrasonic generators to generate signals comprising two or more frequencies, wherein a difference frequency signal is amplified, e.g. corresponding to a contact resonance frequency of the AFM cantilever 22 with the tip 21 contacting the top surface 10a.

In one embodiment, the AFM tip 21 is scanned over different locations (X,Y) of the top surface 10a. In another or further embodiment, the subsurface nanostructures 10n are imaged based on a contrast of a measured signal, e.g.

contrast between areas with and without buried nanostructures and/or nanostructures having different acoustoelastic properties such as different elastic modulus, speed of sound, etcetera.

Typically, the substrate or sublayer forming the waveguide 10g has a plate shape with a height that is lower than its length and/or width by a factor of at least ten, hundred, or even thousand. For example, the waveguide has a thickness "d" less than hundred micrometers, less than ten micrometers, or even less than one micrometer. For example, the substrate has a length and width more than one millimeter, typically several millimeters or centimeters for a chip, or up to three hundred or four hunched fifty millimeter, or more for a wafer. In case the waveguide 10g is formed by a sublayer of the substrate 10, the sublayer preferably has different acoustic properties than the surrounding medium of the substrate. For example the waveguide 10g comprises or essentially consists of material having a different speed of sound (e.g. bulk or phase velocity) for the guided ultrasound waves W than that of the surrounding layers, e.g. a speed of sound that is different by at least ten percent, twenty percent, fifty percent, or more.

Typically the buried nanostructures 10n to be detected inside the substrate 10 may comprise elements, materials, and/or substructures (e.g. circuit parts) being acoustically or elastically distinguishable from the surrounding substrate medium and having typical dimensions e.g. between 0.1-1000 nanometer, or between 1-100 nanometer. For example the nanostructures 10n comprise or essentially consist of material having a different speed of sound (bulk velocity) than the surrounding medium (waveguide or substrate), e.g. a speed that is different by at least ten percent, twenty percent, fifty percent, or more. The nanostructures may be buried below the top surface 10a with at least one sublayer of the substrate 10 there between, e.g. at depths below the top surface 10a of at least ten, twenty, fifty, hundred nanometers, or even deeper, e.g. up to several micrometers.

Figure 2A:
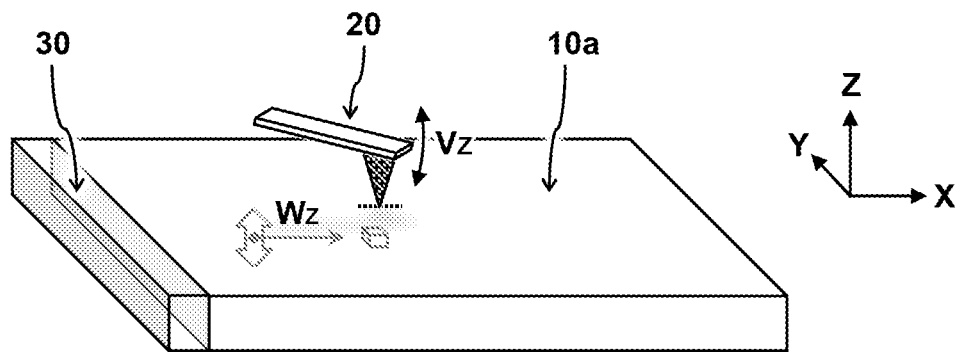
FIGS. 2A-2C schematically illustrate guided waves with different orientations of oscillation.
Figure 2B:
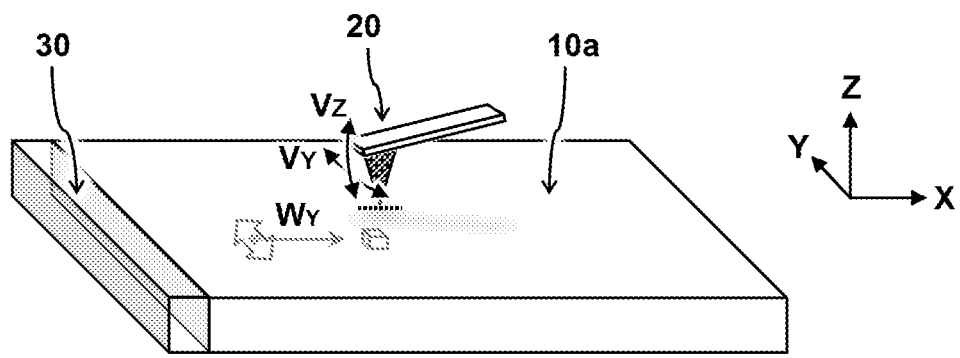
Figure 2C:
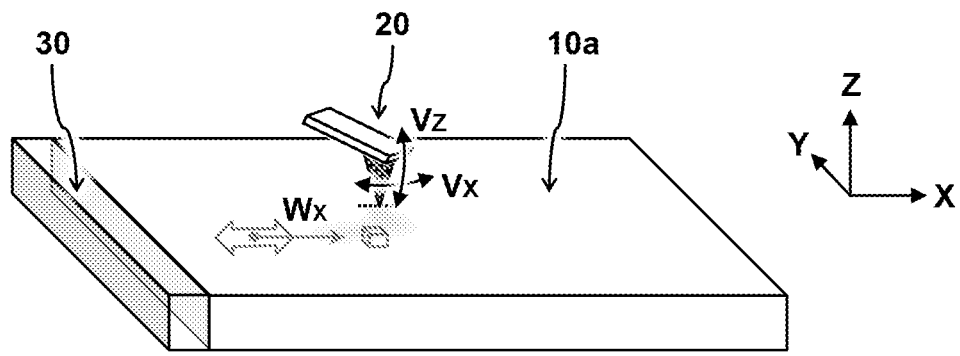

FIGS. 2A-2C schematically illustrate guided waves with different orientations of oscillation.

In a preferred embodiment, the ultrasound waves are shear or transverse guided waves having a main component of oscillation in a direction "Y" or "Z" transverse to their direction of propagation "X". Accordingly, the ultrasonic generator 30 is configured to actuate the side face of the substrate 10 in a direction along its surface, For example, the ultrasonic generator 30 is configured to expand and contract in a direction "Z" transverse to the top surface 10a. For example, the ultrasonic generator 30 comprises a piezo crystal powered by electrodes, wherein the crystal orientation dimensions, and placement of the electrodes are configured to have the crystal resonate in the direction "Z" for a given actuation frequency.

In the embodiment of FIG. 2A, the transverse guided waves oscillate in a direction "Z" transverse to the top surface 10a. This may be preferred for the atomic force microscope 20 to pick up vibrations "Vz" of the top surface 10a resulting from the transverse guided waves "Wz", e.g. by up-and-down, out-of-plane, movement the AFM cantilever.

In the embodiment of FIG. 2B, the transverse guided waves oscillate in a direction "Y" along the top surface 10a. For example, the atomic force microscope 20 is configured to pick up vibrations "Vy" along the top surface 10a resulting from the transverse guided waves "Wy", e.g. torsional or in-plane movement of the AFM cantilever. Alternatively, or additionally, in guided wave mode excitation, the actuator may vibrate laterally, but can also result in a normal displacement of the top surface 10a. Also in this mode, an AFM tip may thus indent in the substrate. How the normal displacement is coupled from the designated layer to the sample surface depends for example on the excitation frequency. Tuning of the frequency can be used to e.g. tune the angle of leakage (described in detail later with reference to FIG. 4), and the normal component of indentation can be tuned accordingly.

In the embodiment of FIG. 2C, the ultrasound waves are compressional or longitudinal guided waves having a main component of oscillation in a direction "X" of propagation. In one embodiment, the atomic force microscope 20 is configured to pick up vibrations "Vx" along the top surface 10a resulting from the longitudinal guided waves "Wx", e.g. torsional or in-plane movement of the AFM cantilever. Also vibrations "Vz" and/or "Vy" may be present. In some embodiments, a length of the AFM cantilever extends in a direction transverse to the vibration of the transverse or longitudinal guided waves "Wx" or "Wy" having a main component of oscillation in a direction "X" or "Y" along the top surface 10a to pick up in-plane movement of the top surface 10a resulting in torsional vibration Vy,Vz of the cantilever.

Figure 3A:
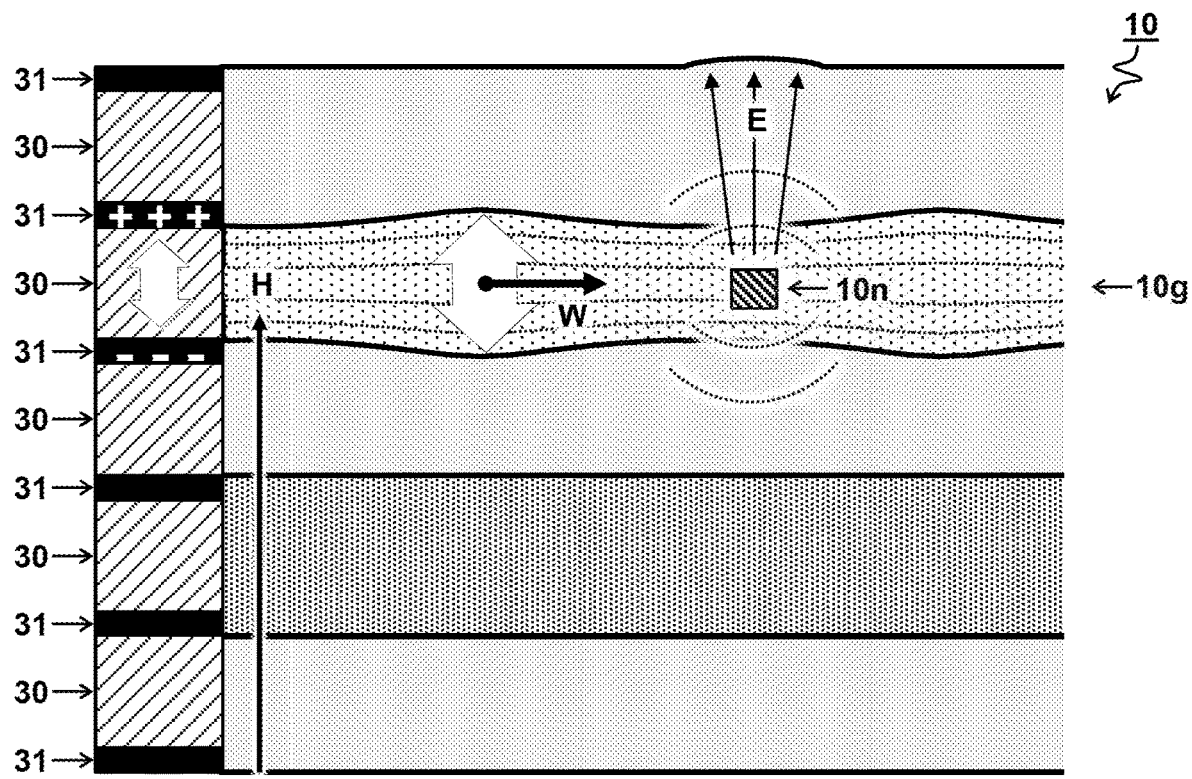
FIGS. 3A and 3B schematically illustrate embodiments for selectively injecting ultrasound waves in a specific sublayer of the substrate forming the waveguide.
Figure 3B:
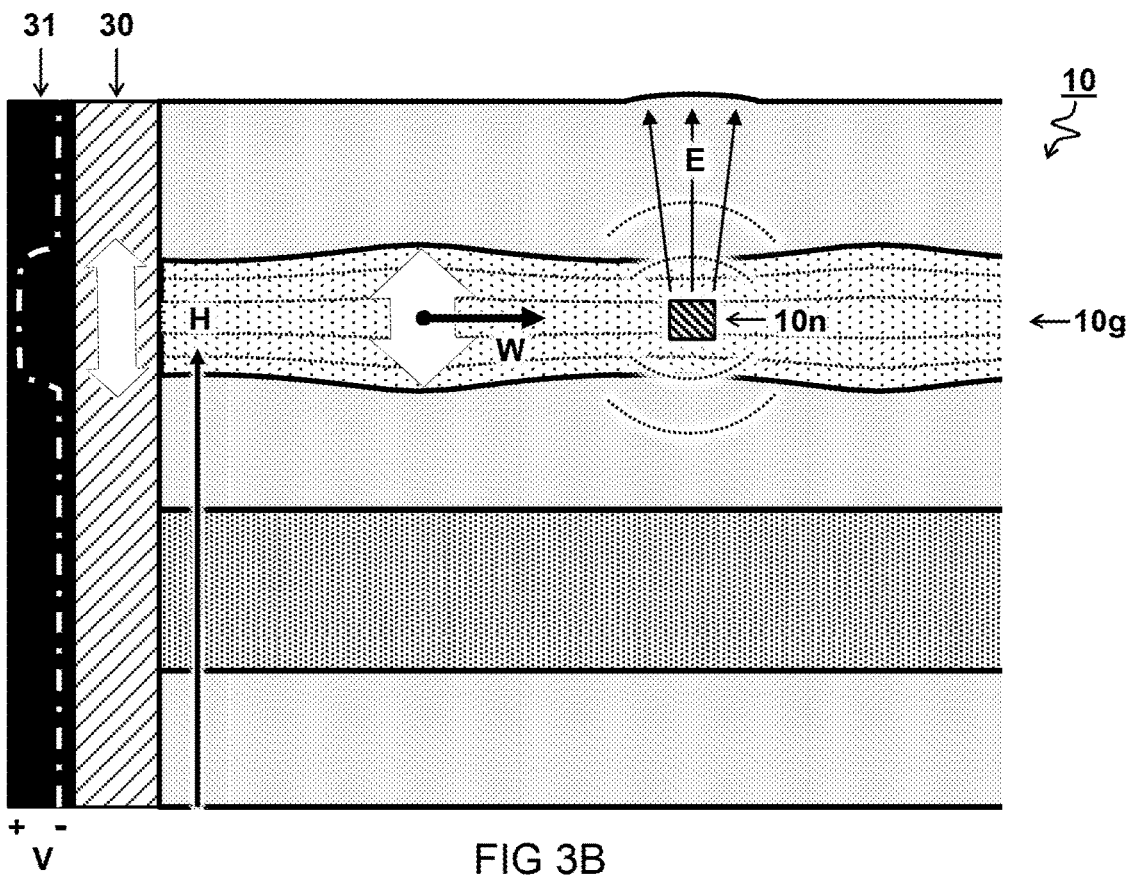

FIGS. 3A and 3B schematically illustrate embodiments for selectively coupling ultrasound waves in a specific sublayer forming a waveguide 10g inside the substrate 10.

Preferably, the sublayer comprises distinct wave guiding properties compared to adjacent layers, e.g. the sublayer comprises a distinct material or combination of materials. Accordingly, the ultrasound waves "W" can propagate inside the waveguide 10g formed by the sublayer. In the embodiment shown, the ultrasonic generator 30 is configured to selectively inject the ultrasound waves "W" at a specific height H in a sublayer of the substrate 10, wherein the sublayer forms the waveguide 10g.

The present embodiment may be compared to another embodiment wherein the waveguide 10g is formed by an entire thickness of the plate shaped substrate 10 (e.g. FIG. 1). In such embodiment, the ultrasound waves "W" are coupled over an entire thickness of the substrate 10. In some embodiments, the ultrasound waves "W" propagate inside a waveguide 10g formed by the entire substrate 10, or multiple layers of the substrate (not shown).

In the embodiment of FIG. 3A, the ultrasonic generator 30 comprises a plurality of actuation elements arranged in a stacked formation to selectively actuate the side face of the substrate 10 at a selected one or more heights H. In another or further embodiment, the ultrasonic generator 30 is controlled by a plurality of controlled elements 31, e.g. electrodes interposed between piezo elements as shown; or electrodes attached to a side face of a piezo element in stacked formation (not shown)

In the embodiment of FIG. 3B, the ultrasonic generator 30 comprises a single actuation element with a control element 31 configured to selectively control parts of the actuation element to actuate at a selected one or more heights H. For example, a different voltage "V" can be applied at by apodization of different heights of the generator 30.

In some embodiments (not shown) the ultrasonic generator 30 is configured to generate ultrasound waves "W" in the waveguide 10g at two or more different wave modes, e.g. a first wave mode at a first frequency range and a second wave mode in a second frequency range. In one embodiment, a first guided wave is generated in a specific sublayer, e.g. in a GHz scattering domain, and a second guided wave is generated over the entire substrate, e.g. in a MHz elastic domain. In some embodiments, multiple wave modes are generated by a single ultrasonic generator, e.g. exciting the thickness mode or one of the lateral modes different resonance frequencies can be generated to vibrate the substrate. In other or further embodiments, a first generator is stacked between a second generator and the side face of the substrate 10, wherein the first generator is configured to pass ultrasound waves "W" generated by the second generator to the side face of the substrate 10. For example, the first generator is configured to inject a GHz wave in a particular sublayer of the substrate 10 while the second generator is configured to generate MHz waves for actuating the entire substrate.

In the embodiments of FIGS. 3A and 3B, the nanostructures 10n to be imaged are comprised in a sublayer of the substrate 10 wherein the sublayer forms the waveguide 10g. For example, the substrate 10 comprises a plurality of layers with a designated layer comprising one or more nanostructures 10n to be imaged. In another or further embodiment, the sublayer comprises nanostructures 10n forming an alignment marker to be imaged for alignment of other layers. For example, in a three-dimensional chip structure, one or more circuit layers or other layers comprise respective alignment markers used for relative alignment of new layers. Alternative to imaging nanostructures 10n inside a waveguide 10g, also features outside the waveguide 10g can be imaged as will be discussed with reference to FIG. 4. In some embodiments, the waveguide 10g is formed by a dedicated waveguide layer e.g. interposed between circuit layers.

Figure 4A:
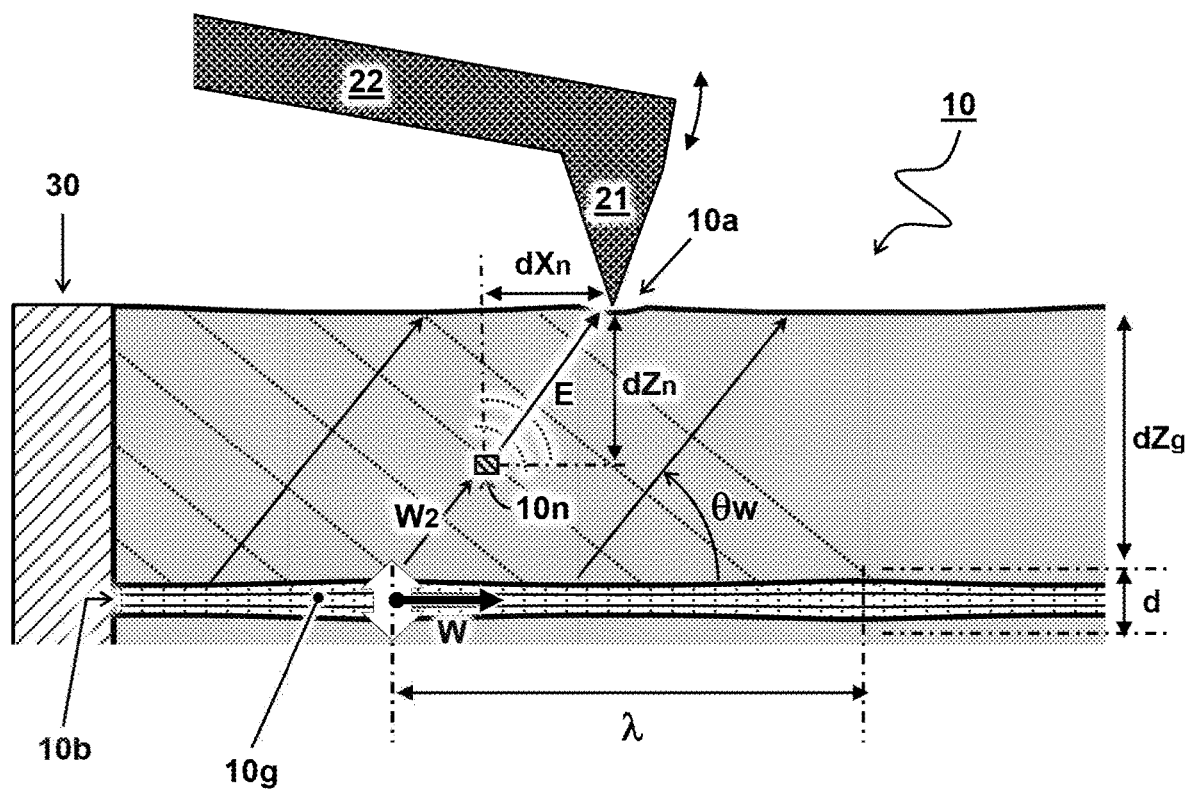
FIGS. 4A and 4B schematically illustrates an embodiment for imaging nanostructures using secondary waves.
Figure 4B:
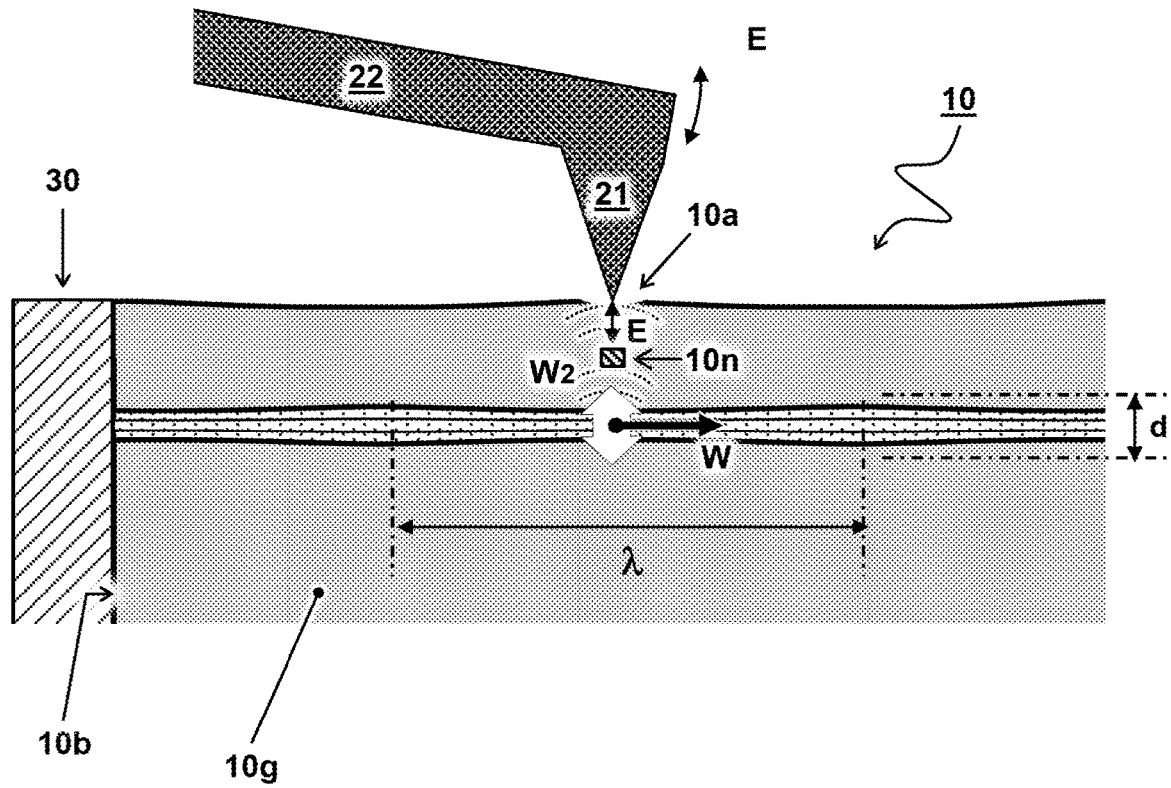

FIGS. 4A and 4B schematically illustrate embodiments for imaging nanostructures outside the waveguide 10g using secondary waves "W2".

In the embodiments shown, the nanostructures 10n to be imaged are arranged between the top surface 10a and a deeper laying waveguide 10g formed by a sublayer of the substrate 10. For example, secondary waves "W2" emitted from the waveguide 10g and propagating towards the top surface 10a interact with the nanostructures 10n on the path there between. In another embodiment (not shown), the sublayer forming the waveguide 10g can be arranged between the top surface 10a and the nanostructures 10n beneath, e.g. wherein secondary waves "W2" reflect off the nanostructures 10n through the waveguide 10g back towards the top surface 10a.

In the embodiment of FIG. 4A, the phase velocity of waves in the waveguide 10g is higher than a speed of sound in the adjacent layers (bulk velocity of surrounding medium). This may lead to a situation wherein the ultrasound waves "W" traversing the waveguide 10g cause emission of leaky or secondary waves "W2" towards the top surface 10a. As shown, the secondary waves "W2" can be emitted at an angle "θw" with respect to a length of the waveguide 10g. For example, the angle "θw" can be calculated as being dependent on the relative difference between the phase velocity of the guided wave "W" in the waveguide 10g and the speed of sound in the adjacent medium (above or below the waveguide 10g).

As shown, the effect "E" of interaction by the secondary waves "W2" with the nanostructures 10n, sensed at the top surface 10a, can be displaced in a direction dXn along a propagation direction "X" of the ultrasound waves "W". For example, the displacement can be calculated from the angle "θw" of the secondary waves "W2" and a depth "dZn" of the nanostructures 10n below the top surface 10a. For example, the depth "dZn" of the nanostructures 10n is known or calculated, e.g. based on a time of arrival of the ultrasound waves "W" and/or secondary waves "W2".

Conversely, in the embodiment of FIG. 4B, the phase velocity of the waves "W" in the waveguide 10g is lower than a speed of sound in the adjacent layers. This may lead to a situation wherein the ultrasound waves "W" traversing the waveguide 10g cause emission of an evanescent secondary wave W2 e.g. wherein the angle of leakage is imaginary. Typically, the interaction of evanescent secondary wave W2 decreases exponentially away from the waveguide 10g. This may lead to a relatively short interaction range making it more suitable for detecting nanostructures 10n close to the waveguide 10g.

Figure 5A:
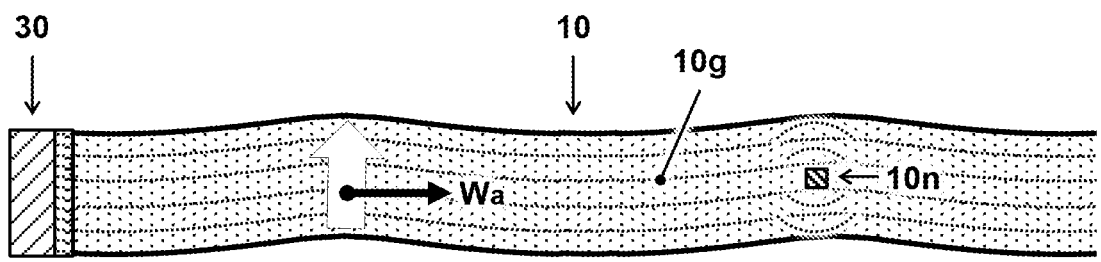
FIGS. 5A-5C schematically illustrates different wave modes.

FIG. 5A schematically illustrates an embodiment for guided ultrasound waves in a waveguide 10g according to an asymmetric wave mode "Wa", also referred to as flexural wave mode. Flexural modes are non-axially symmetric bending modes. For example, in a plate the fundamental flexural mode F(1,1) is a pure bending mode at zero frequency.

Figure 5B:
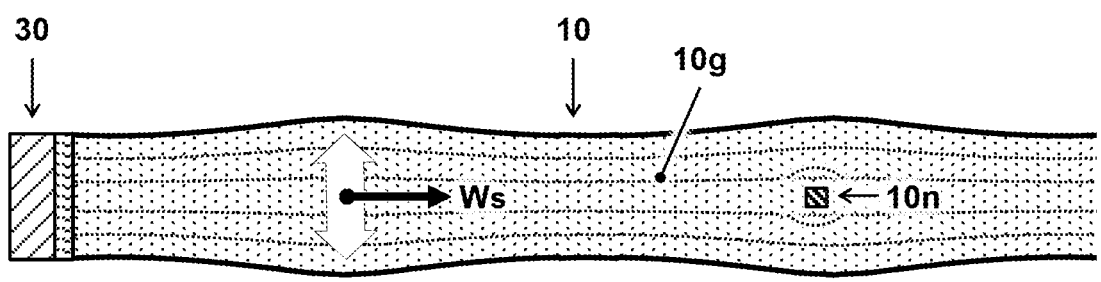

FIG. 5B schematically illustrates an embodiment for guided ultrasound waves in a waveguide 10g according to a symmetric (with respect to a neutral plane) wave mode "Ws".

Figure 5C:
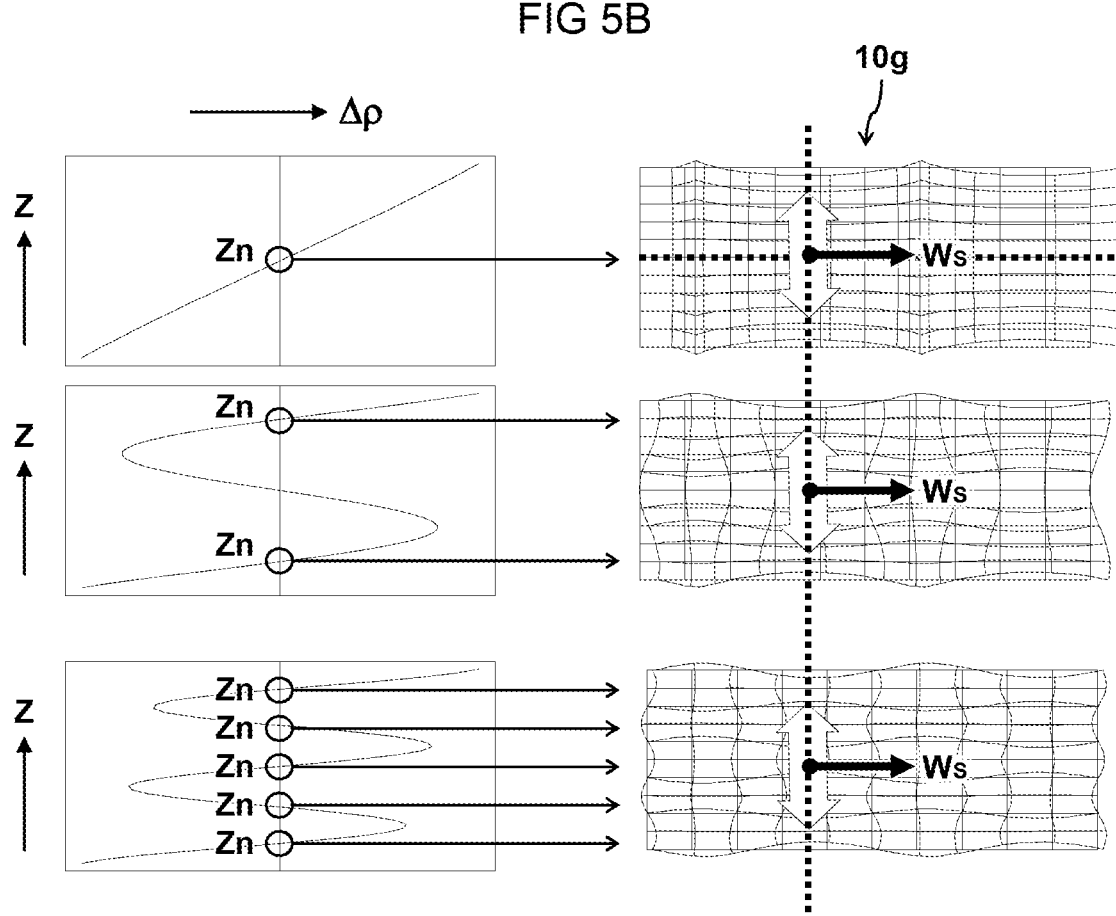

FIG. 5C schematically illustrates various neutral lines "Zn" that may particularly occur in symmetric wave modes "Ws". In some embodiments, one or more wave modes of the ultrasound waves comprises one or neutral lines or planes "Zn" in the waveguide 10g with minimal or no oscillation. In one embodiment, one or more depths are selectively not actuated at the neutral lines Zn of the wave mode, e.g. "Ws". In another or further embodiment, the wave mode is varied to select neutral lines at specific layers not being imaged. For example, the entire substrate 10 is actuated by a symmetric wave mode "Ws", e.g. in a MHz domain, wherein imaging comprises varying the interaction at different depths by selecting the neutral lines of the wave mode. In this way selective probing at particular depths can be effected even using MHz waves spanning the entire substrate height.

Figure 6A:
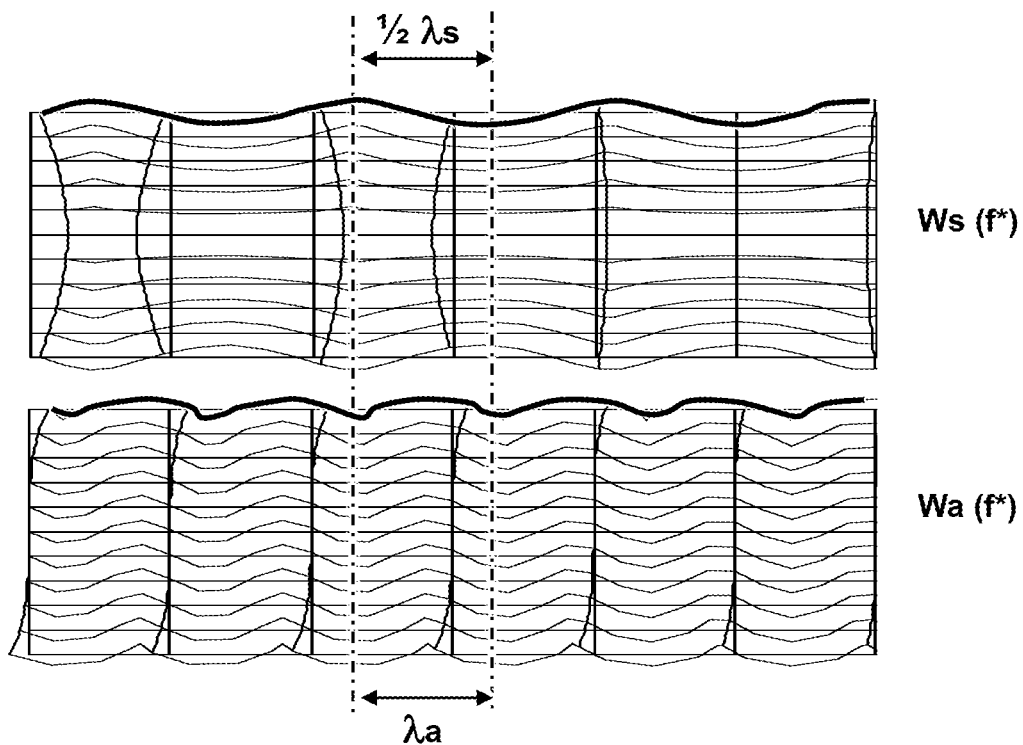
FIG. 6A schematically illustrates different wavelengths depending on wave mode.

FIG. 6A schematically illustrates different wavelengths "λs" and "λa" depending on the wave mode "Ws" or "Wa", respectively at the same excitation frequency (f*) for the same sample. In some embodiments, the ultrasound waves "W" comprise multiple wave modes such as "Ws" and "Wa" at a particular actuation or measurement frequency "f*". The wave modes can act simultaneously on the AFM probe e.g. if the ultrasound generator is not designed to enhance one particular mode. In some embodiments, particular wave modes can be suppressed or enhanced e.g. by suitable actuation. In some embodiments, imaging of the subsurface nanostructures is adapted to be sensitive to a particular wave mode, e.g. at a distinct wavelength, wave velocity, or other characteristic.

Figure 6B:
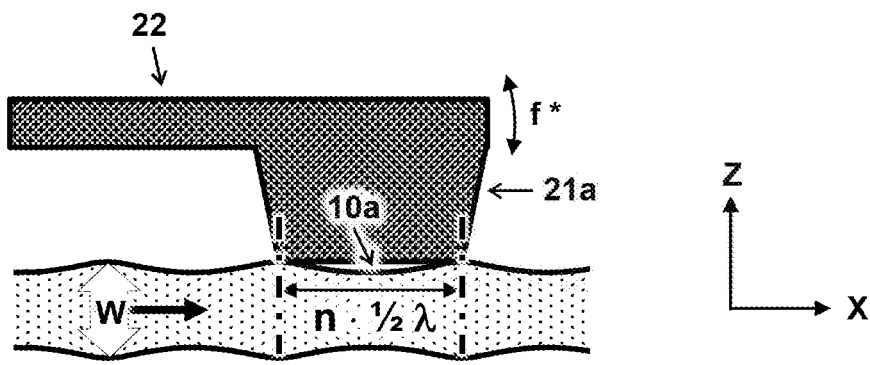
FIGS. 6B and 6C schematically illustrate embodiment for AFM probes.
Figure 6C:
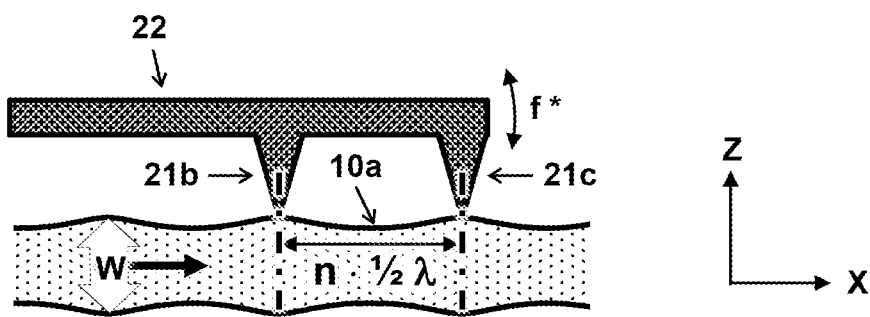

FIG. 6B schematically illustrates an embodiment for an AFM probe with a tip width adjusted to a wavelength "λ" to be detected. FIG. 6C schematically illustrates another embodiment for an AFM probe with a multiple tips placed apart with a distance adjusted to a wavelength to be detected;

In some embodiments, the AFM cantilever 22 comprises one or more AFM tips 21a,21b,21c contacting the substrate top surface 10a at one or more contact points spanning a distance across the top surface 10a, wherein the spanned distance along the propagation direction "X" of the ultrasound waves "W" equals an integer times a half wavelength "½ λ" of one of the wave modes at an actuation or measurement frequency "f*" of the AFM cantilever 22. In other or further embodiments, one of the multiple wave modes is isolated (enhanced or suppressed) by taking a linear combination of measurements at multiple locations across the top surface 10a. For example, as shown with reference to FIG. 6A, two measurements are taken at a half wavelength distance "½ λs" of the symmetric wave mode "Ws". By adding the measurements, the symmetric wave mode "Ws" may cancel while another wave mode having another wavelength at the same frequency "f*", e.g. the asymmetric wave mode Wa does not cancel and may even be amplified, e.g. when the distance equals the wavelength "λa" of the asymmetric wave mode Wa.

Figure 7:
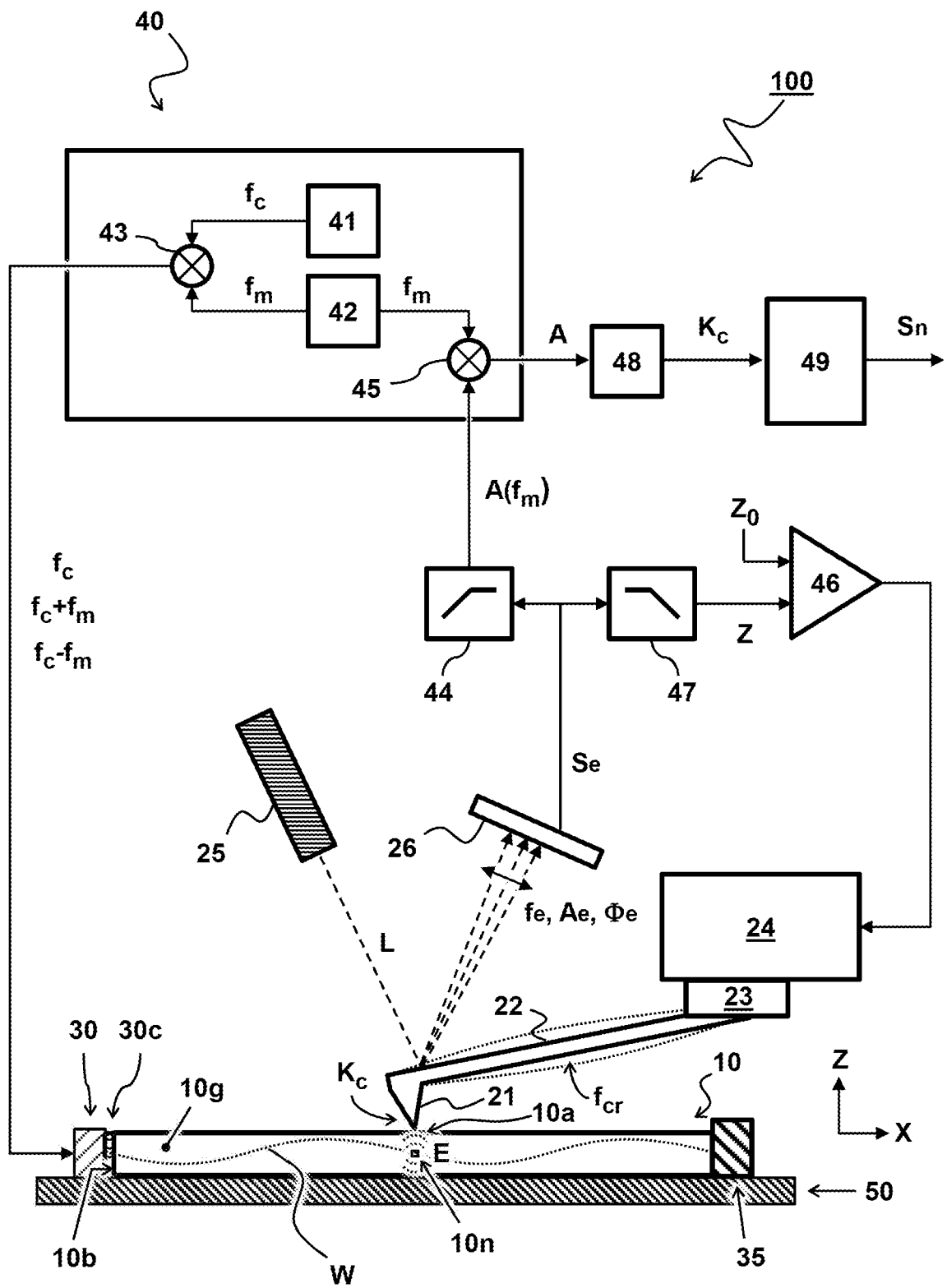
FIG. 7 schematically illustrates an embodiment for an AFM system with possible control logic.

FIG. 7 schematically shows an embodiment of an AFM system 100 comprising an ultrasonic generator 30 configured to generate guided ultrasound waves (W) via a side face 10b of a substrate 10.

In one embodiment, the system 100 comprises a substrate holder 50 configured to hold a plate shaped substrate 10 with the nanostructures 10n to be imaged. In another or further embodiment, the system comprises an AFM tip 21 configured to scan a top surface 10a of the substrate 10. Typically the AFM tip 21 and/or substrate holder 50 are configured for relative movement to scan the substrate 10.

An ultrasonic generator 30 is configured to couple ultrasound waves "W" via a side face 10b of the substrate 10 into an interior of the substrate 10. The interior comprises or forms a waveguide 10g for propagating the ultrasound waves "W" in a direction "X" along a length of the substrate 10 transverse to the side face 10b. The ultrasonic generator 30 is configured to actuate the side face 10b with a frequency corresponding to a wavelength "X" of the ultrasound waves "W" propagating in the waveguide 10g that larger than a thickness "d" of the waveguide 10g transverse to the direction of propagation "X".

In the embodiment shown, the system 100 comprises a sensor system configured to image the nanostructures 10n by using the AFM tip 21 and/or cantilever 22 to measure an effect "E" at the top surface 10a caused by direct or indirect interaction of the ultrasound waves "W" with the buried nanostructures 10n. In some embodiments, an element 35 is placed on an opposite side of the substrate 10 with respect to the ultrasonic generator 30 to block the substrate such that waves can be more efficiently coupled in the medium. For example, the substrate 10 is pressed against the ultrasonic generator 30, e.g. by a pressing tool 35.

In the shown embodiment of the AFM, a probe is attached to a scan head 24. The scan head 24 enables scanning of the probe relative to a top surface 10a of substrate 10. The probe consists of a cantilever 22 and a probe tip 21. During scanning, the probe tip 21 is brought in contact with the top surface 10a of the substrate 10. For example the probe tip 21 may be scanned across the surface of the substrate 10 in contact mode (continuous contact between the probe tip 21 and the surface of the substrate 10) or tapping mode (periodic contact between the probe tip 21 and the surface of the substrate 10 during each cycle of a vibration applied to the cantilever 22).

In some embodiments, the AFM is configured to measure subsurface nanostructures 10n below the top surface 10a. In one embodiment, the AFM tip 21 is brought in contact with an area under investigation. In another or further embodiment, a subsurface parameter Sn is calculated based on measurement of a contact stiffness Kc of the atomic force microscope AFM at the exposure area 1a. Typically, ultrasound waves "W" in the substrate 10 may be coupled via the AFM tip 21 to the AFM cantilever 22 causing vibration of the AFM cantilever 22. For example, a vibrational amplitude "Ae" of the AFM cantilever 22 may depend on a contact stiffness Kc of the AFM tip 21 contacting the substrate 10. Contact stiffness Kc may be quantified e.g. as the combined stiffness of the tip contacting the substrate, e.g. derivate of a force experienced by the tip as a function of displacement of the tip. It will be appreciated that the contact stiffness Kc may depend on material properties of the nanostructures (10n) below the substrate surface 10a. In turn, the contact stiffness may determine vibrational modes in the AFM cantilever 22.

In some embodiments a contact resonance frequency "fcr" of the AFM cantilever 22 may depend on the contact stiffness Kc. Accordingly, a contact resonance frequency "fcr" of the AFM cantilever 22 while the AFM tip 21 contacts the substrate 10 can be a measure for the effect "E" of the interaction between the ultrasound waves "W" with the nanostructures 10n below the top surface 10a. The contact resonance frequency "fcr" may be probed e.g. by including a modulation frequency "fm" in the ultrasound waves "W" through the substrate 10. Alternatively, or in addition, ultrasound waves may be generated at the tip (not shown), or both at the tip and the sample simultaneously (not shown). For example, the ultrasound waves "W" can be modulated by a modulation frequency "fm" near a contact resonance frequency "fcr" of the AFM. The closer the modulation frequency "fm" is to the contact resonance frequency "fcr", the higher the amplitude "A" of the resulting vibration in the AFM cantilever 22 at that frequency. Accordingly, in some embodiments, the imaging of subsurface nanostructures 10n may be based on a measurement of a vibrational amplitude "Ae" of the AFM cantilever 22. Also other parameters such as the frequency "fe" and/or phase of the cantilever vibration can be used as measure for the nanostructures 10n.

In addition to the modulation frequency "fm", the ultrasound waves "W" may comprise other signal components, e.g. a carrier frequency "fc". For example, the carrier frequency "fc" can be a relatively high frequency determining scattering interaction with the nanostructures 10n while the modulation frequency "fm" is at a relatively low frequency near a contact resonance frequency of the cantilever. For example, the carrier frequency "fc" is between 100 MHz and 100 GHz. For example, the modulation frequency "fm" is lower than the carrier frequency "fc", e.g. by a factor of at least ten, e.g. between 10 kHz and 10 MHz. Of course also other frequencies, e.g. for heterodyne detection, can be envisaged depending on the particulars of the system under investigation and/or intrinsic properties of the cantilever.

Preferably, the ultrasound waves "W" comprise a wavelength in the waveguide which is higher than its thickness. In case of multiple frequencies, it is preferred that the wavelength corresponding to the highest frequency is still relatively long compared to the waveguide thickness so that the waves act as guided waves. For example, in an acoustic wave at a frequency of 1 GHz ($10^9$ $s^{-1}$) and velocity of 1000 m/s, the expected wavelength is 1 μm ($10^3/10^9=10^{-6}$ m=1 μm). Accordingly the waveguide in such cases preferably has a thickness of a fraction of one micrometer. For example, a substrate such as a chip or a substrate layer such as a circuit layer has a thickness of less than one micrometer. The thickness can be higher for lower frequencies, e.g. in a MHz range below 250 MHz or for higher wave velocities. For example in a waveguide structure formed by a silicon layer, the speed of sound can be between 5000-10000 m/s depending on the wave mode (longitudinal, transversal, extensional). Accordingly, one or more silicon circuit layers with a (combined) thickness up to 0.1 μm could be used as waveguide for a wave at a frequency up to 50-100 GHz.

Ultrasonic force microscopy may for example be performed by applying an ultrasonic signal to side face of the substrate and modulating the ultrasonic wave with a modulation frequency "fm" of approximately the cantilever resonance frequency. By sensing the output signal at the modulation frequency and analyzing the amplitude and/or phase, subsurface structures can be imaged. Without being bound by theory, this may be explained by the fact that the high frequency (fc) ultrasonic signal may be perturbed by the subsurface structures. Information on the subsurface structures is conveyed via these perturbations and becomes measurable in the deflection of the probe tip, i.e. the output sensor signal at or near the cantilever resonance frequency.

In the embodiment shown, a signal generation and analysis system 40 is used to generate and extract signals. A first signal generator 41 provides a first signal at the carrier frequency "fc". A second signal generator 42 provides a second signal at the modulation frequency "fm". The frequencies may serve as input for a mixer 43 which generates mixed signals e.g. providing three frequency components: the carrier frequency fc, the carrier frequency fc lowered by the modulation frequency "fm" to obtain a frequency component fc−fm, and the carrier frequency fc increased by the modulation frequency "fm" to obtain a frequency component fc+fm. For example, offering these frequency component signals in a favorable signal component ratio (e.g. fc:(fc−fm):(fc+fm)=1:0.5:0.5) may yields an amplitude modulated wave having a frequency "fc" wherein the amplitude modulates at a frequency "fm".

In the embodiment shown, a single ultrasonic generator 30 (transducer) is shown to generate ultrasound waves "W" at a particular set of frequencies. Alternatively, or in addition, multiple ultrasonic generators (not shown) can be used in homodyne or heterodyne configuration. For example an additional frequency may be applied directly to the AFM probe, e.g. by a modulated laser beam L or otherwise. Furthermore, signals may be generated at alternative or additional frequencies than shown or only at a single (modulation) frequency. In some embodiments, the signals may be amplified in a power amplifier (not shown) before being provided to the generator 30. In the shown embodiment, a coupling medium 30c (e.g. wax) is used to provide for acoustic coupling between the generator 30 and the substrate 10. In alternative embodiments this may be omitted.

In the embodiment shown, the laser 25 sends a light beam "L" at a position on the AFM cantilever 22. Vibrational movement of the AFM cantilever 22 causes deflection of the reflected beam which is measure by sensor 26 which is sensitive to the position of the impinging beam, e.g. a quadrant detector. The sensor 26 results in a measurement signal Se.

In one process path, high frequency components of the signal Se are extracted by a high pass filter 44 to the analysis system 40. In particular, the passed signal comprises a frequency component with a certain amplitude "A" at the modulation frequency "fm". The amplitude "A" may be retrieved e.g. by a demodulator 45 using the original modulation frequency "fm" as reference. For example, the demodulator 45 may comprise a lock-in amplifier. The amplitude "A" may be processed by a processor 48 to calculate the contact stiffness Kc. The contact stiffness may be used by processor 49 to calculate subsurface parameter Sn for imaging the nanostructures 10n. Of course the processors 48 and 49 may also be integrated. Alternatively, or in addition, the step of calculating the contact stiffness Kc may omitted and the subsurface parameter Sn directly calculated from the vibrational amplitude "Ae" or any other measured characteristics such as fe and Φe. Alternatively, or in addition, the contact stiffness Kc may be directly equated to the subsurface parameter Sn.

In another process path, low frequency components of the signal Se are extracted by a low pass filter 47 as a measure of a distance or height "Z" between the AFM tip 21 over the substrate surface 10a. The measured distance may be fed into a comparator 46 together with a desired distance "Z0", e.g. corresponding to a desired average force/deflection of the probe. The output signal of the comparator may be used to control a height of the scan head 24 to which the probe is attached.

While the present embodiment shows ultrasound waves being applied via the substrate, ultrasound AFM can be additionally done via tip, e.g. by optional transducer 23. Accordingly, various embodiments can be envisaged such as heterodyne force microscopy, atomic force acoustic microscopy, waveguide ultrasonic force microscopy, force modulation microscopy. Preferably, the ultrasonic generator 30 contacts the side face 10b of the substrate 10 directly, or indirectly via a coupling medium 30c. The generator preferably comprises an electro-acoustic transducer, e.g. based on piezo transducers, electrostatic actuation etc. In some embodiments, additional ultrasound in the AFM cantilever 22 can be generated in various ways such as using piezo transducers, electrostatic actuation, photo thermal actuation via the light beam "L", etc.

In the embodiment shown, a laser source 25 provides a laser beam L that impinges on the cantilever 22 and reflects towards an optical detector 26. Using the optical detector 26, vibrations in the cantilever 22 can be sensed due to small deflections of the reflected beam L under influence of such vibrations. This provides an output signal Se for further analysis, e.g. by a processor to calculate an image of subsurface nanostructures 10n. In some embodiments, the processor may comprise a memory to store previous measurements or reference values for comparison.

Alternative or in addition to measuring beam deflection also other ways may be envisaged for measuring the cantilever deflection and/or vibration frequency/amplitude. Alternative sensing techniques for example include the application of a piezo-resistive layer, the electrical resistance of which vary with probe deflection. Probe deflection may in that case be detected by detecting voltage differences in an electric signal applied to the piezo-resistive layer. As another alternative, probe deflection may be detected using a piezo-electric element or layer, the potential of which changes dependent on cantilever motion. Alternatively, capacitive measurements may be applied in an electrostatic sensing technique. As some further alternatives, one may also apply an interferometer to measure probe deflection or perform a heat flux measurement in a thermal method by using a temperature difference between probe and substrate. The skilled person will be familiar with such techniques and is able to apply them in embodiments of the present disclosure.

Figure 8:
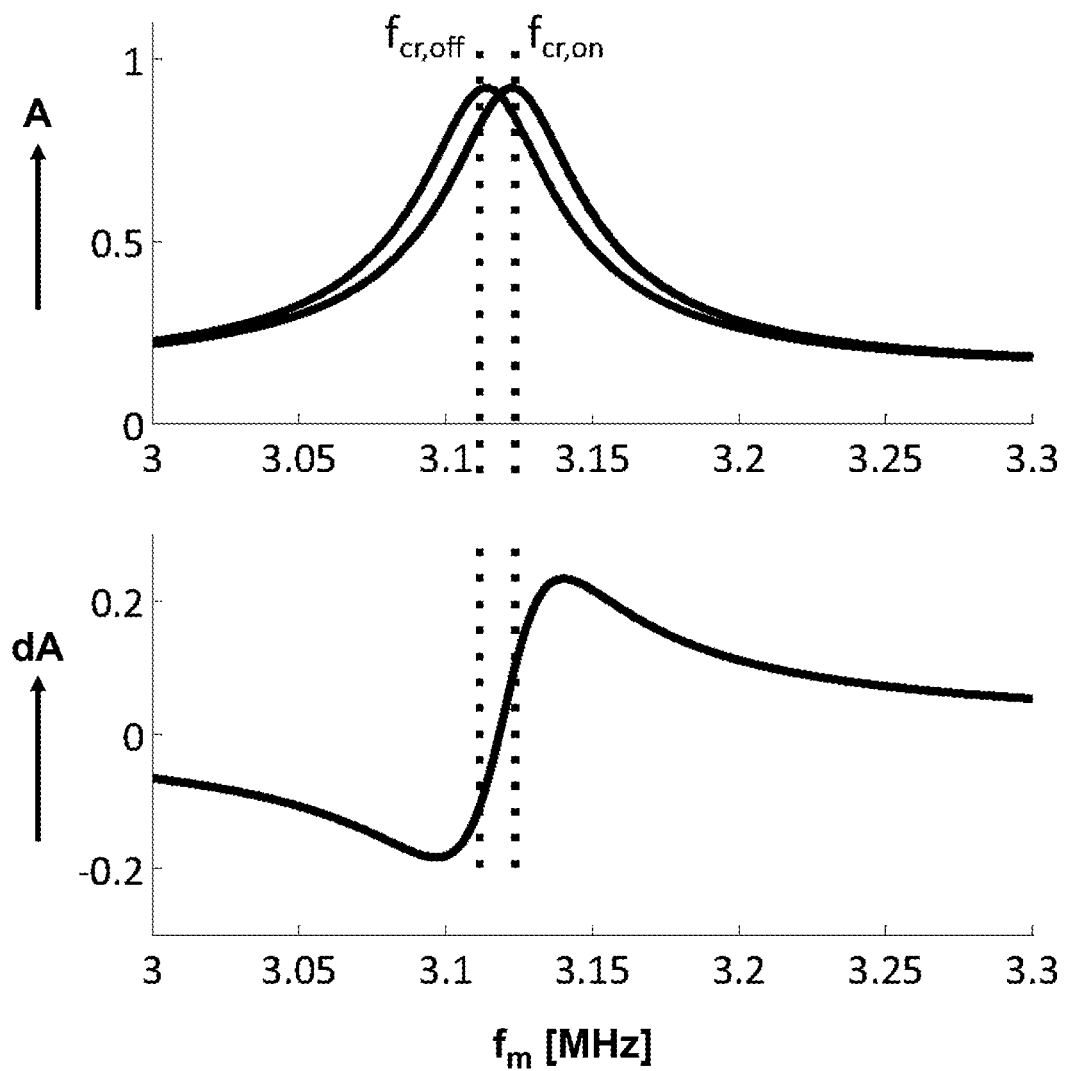
FIG. 8 schematically illustrates possible measurement curves depending on buried nanostructures.

FIG. 8 schematically shows curves indicative of a vibrational amplitude "A" depending on a proximity between the modulation frequency "fm" and the contact resonance frequency "fcr".

As shown, the modulation frequency "fm" near the contact resonance frequency "fcr" causes an amplitude increased of the AFM cantilever vibrations. For example the amplitude may increase by a factor of two or more compared to an off-resonant vibration of the AFM cantilever. In one embodiment, a position of the contact resonance frequency shifts depending whether the AFM tip contacts an area affected by interaction of the ultrasound waves with a buried nanostructures ("fcr,on") or an areas of the substrate without nanostructures ("fcr,off"). As shown in the bottom curve, at certain modulation frequencies, such shifting of the contact resonance frequency "fcr" causes an amplitude difference "dA" of the (cantilever) vibrations caused by the ultrasound waves between the areas with and without buried nanostructures. Alternatively, or in addition to shifting, an overall amplitude of the curve may increase or decrease (not shown here) depending on the presence or absence of buried nanostructures. In one embodiment, the amplitude difference "dA" is used for calculating an image of the subsurface nanostructures. Alternative, or in addition to a change in amplitude "dA", also other changes can be used as parameter for subsurface imaging, e.g. a phase and/or frequency shift (not shown).

For the purpose of clarity and a concise description, features are described herein as part of the same or separate embodiments, however, it will be appreciated that the scope of the invention may include embodiments having combinations of all or some of the features described. For example, mechanical and electrical components may be combined or split up into one or more alternative components. The various elements of the embodiments as discussed and shown offer certain advantages, such as detection and imaging of subsurface nanostructures. Of course, it is to be appreciated that any one of the above embodiments or processes may be combined with one or more other embodiments or processes to provide even further improvements in finding and matching designs and advantages. It is appreciated that this disclosure offers particular advantages to alignment of 3D chip layers, and in general can be applied for any application of subsurface imaging using guided waves in relatively thin substrates.

Finally, the above-discussion is intended to be merely illustrative of the present systems and/or methods and should not be construed as limiting the appended claims to any particular embodiment or group of embodiments. The specification and drawings are accordingly to be regarded in an illustrative manner and are not intended to limit the scope of the appended claims. In interpreting the appended claims, it should be understood that the word "comprising" does not exclude the presence of other elements or acts than those listed in a given claim; the word "a" or "an" preceding an element does not exclude the presence of a plurality of such elements; any reference signs in the claims do not limit their scope; several "means" may be represented by the same or different item(s) or implemented structure or function; any of the disclosed devices or portions thereof may be combined together or separated into further portions unless specifically stated otherwise. The mere fact that certain measures are recited in mutually different claims does not indicate that a combination of these measures cannot be used to advantage. In particular, all working combinations of the claims are considered inherently disclosed.

The invention claimed is:

1. A method for subsurface imaging of nanostructures buried inside a three dimensional substrate the method comprising
providing an atomic force microscope with an AFM tip continuously or periodically contacting a top surface of the substrate;
providing an ultrasonic generator at a side face of the substrate transverse to the top surface;
using the ultrasonic generator to couple ultrasound waves via the side face into an interior of the substrate, wherein the interior comprises or forms a waveguide for propagating the ultrasound waves in a direction along a length of the substrate transverse to the side face, wherein a wavelength of the ultrasound waves propagating in the waveguide is larger than a thickness of the waveguide transverse to the direction of propagation; and
imaging the nanostructures by using the AFM tip to measure an effect at the top surface caused by direct or indirect interaction of the ultrasound waves with the buried nanostructures.

2. The method according to claim 1, wherein the ultrasound waves are shear or transverse guided waves having a main component of oscillation in a direction transverse to their direction of propagation, wherein the ultrasonic generator is configured to actuate the side face of the substrate in a direction along its surface.

3. The method according to claim 1, wherein the ultrasonic generator couples to the side face via a coupling medium, wherein the coupling medium is configured to transmit transversal vibration between the ultrasonic generator and the side face.

4. The method according to claim 1, wherein the ultrasonic generator is configured to selectively couple the ultrasound waves at a specific height in a sublayer of the substrate, wherein the sublayer forms the waveguide.

5. The method according to claim 1, wherein the ultrasonic generator comprises a plurality of actuation elements arranged in a stacked formation to selectively actuate the side face of the substrate at a selected one or more heights or wherein the ultrasonic generator comprises a single actuation element with a control element configured to selectively control parts of the actuation element to actuate at a selected one or more heights.

6. The method according to claim 1, wherein the nanostructures to be imaged are comprised in a sublayer of the substrate wherein the sublayer forms the waveguide.

7. The method according to claim 1, wherein the nanostructures to be imaged are arranged between the top surface and a deeper laying waveguide formed by a sublayer of the substrate.

8. The method according to claim 1, wherein a phase velocity of waves in a waveguide formed by a sublayer of the substrate is higher than a speed of sound in the adjacent substrate layers, wherein the ultrasound waves traversing the waveguide cause emission of leaky or secondary waves towards the top surface, wherein the secondary waves are emitted at an angle with respect to a length of the waveguide, wherein the effect interaction by the secondary waves with the nanostructures, sensed at the top surface.

9. The method according to claim 1, wherein the ultrasound waves comprise an axially symmetric wave mode, wherein the entire substrate is actuated by the symmetric wave mode, wherein the wave mode comprises one or neutral lines or planes in the waveguide with minimal or no oscillation, wherein the imaging comprises varying the interaction at different depths by selecting the neutral lines of the wave mode.

10. The method according to claim 1, wherein the AFM cantilever comprises one or more AFM tips contacting the substrate top surface at one or more contact points spanning a distance across the top surface, wherein the spanned distance along the propagation direction of the ultrasound waves equals an integer times a half wavelength of one of the wave modes at an actuation or measurement frequency of the AFM cantilever.

11. The method according to claim 1, wherein the ultrasound waves interact with the nanostructures by scattering, in a frequency range between 0.6-100 GHz.

12. The method according to claim 1, wherein the ultrasound waves interact with the nanostructures by elastic interaction, typically in a MHz frequency range between 1-250 MHz, or lower, wherein the elastic interaction occurs in the whole substrate including a region with the nanostructures to be imaged.

13. The method according to claim 1, wherein a first generator is stacked between a second generator and the side face of the substrate wherein the first generator is configured to pass ultrasound waves generated by the second generator to the side face of the substrate, wherein the first generator is configured to couple a GHz wave in a particular sublayer of the substrate while the second generator is configured to generate MHz waves for actuating the entire substrate.

14. The method according to claim 1, wherein the substrate comprises a three dimensional integrated chip.

15. An AFM system for subsurface imaging of buried nanostructures, the system comprising
  a substrate holder configured to hold a three dimensional substrate with the nanostructures to be imaged;
  an AFM tip configured to scan a top surface of the substrate by continuous or periodic contact there between;
  an ultrasonic generator configured to couple ultrasound waves via a side face of the substrate into an interior of the substrate, wherein the interior comprises or forms a waveguide for propagating the ultrasound waves in a direction along a length of the substrate transverse to the side face, wherein the ultrasonic generator is configured to actuate the side face with a frequency corresponding to a wavelength of the ultrasound waves propagating in the waveguide that is larger than a thickness of the waveguide transverse to the direction of propagation; and
  a sensor system configured to image the nanostructures by using the AFM tip to measure an effect at the top surface caused by direct or indirect interaction of the ultrasound waves with the buried nanostructures.

* * * * *